United States Patent [19]
Waragai et al.

[11] Patent Number: 5,001,499
[45] Date of Patent: Mar. 19, 1991

[54] LIGHT SCANNING APPARATUS AND IMAGE FORMING APPARATUS UTILIZING SAME

[75] Inventors: Tsuyoshi Waragai, Tokyo; Hiroaki Namiki; Toshifumi Moritani, both of Yokohama, all of Japan

[73] Assignee: Canon Kabushiki Kaisha, Tokyo, Japan

[21] Appl. No.: 546,692

[22] Filed: Jul. 2, 1990

Related U.S. Application Data

[63] Continuation of Ser. No. 462,340, Jan. 2, 1990, abandoned, which is a continuation of Ser. No. 397,895, Aug. 24, 1989, abandoned.

[30] Foreign Application Priority Data

Aug. 26, 1988 [JP] Japan ................................ 63-210772

[51] Int. Cl.$^5$ ............................................. G01D 15/00
[52] U.S. Cl. .................................................... 346/160
[58] Field of Search ...................... 346/145, 157, 160; 358/300; 350/6.7

[56] References Cited

U.S. PATENT DOCUMENTS

| | | | |
|---|---|---|---|
| 4,169,275 | 9/1979 | Gunning | 358/300 |
| 4,578,688 | 3/1986 | Okuno | 346/157 |
| 4,731,623 | 3/1988 | Oda et al. | 350/6.7 |
| 4,907,017 | 3/1990 | Azuma | 346/108 |

*Primary Examiner*—Donald A. Griffin
*Attorney, Agent, or Firm*—Fitzpatrick Cella Harper & Scinto

[57] ABSTRACT

The present invention provides a scanning apparatus for scanning a photosensitive member with laser beams, comprising a scanning optical system having reflection members attached to a driving source and for generating two or more modulated laser beams simultaneously, first reflection members for reflecting the respective modulated laser beams to diverge the laser beams from each other, second reflection members arranged downstreamly of a light path with respect to the first reflection members and for reflecting the reflected laser beams on the photosensitive member, attachment means for fixing the scanning apparatus to a main apparatus and a molded structure for integrally supporting the scanning optical system, first reflection members, second reflection members and attachment means altogether.

24 Claims, 6 Drawing Sheets

LIGHT SCANNING APPARATUS AND IMAGE FORMING APPARATUS UTILIZING SAME

This application is a continuation of application Ser. No. 462,340 filed Jan. 2, 1990, now abandoned, which was a continuation of application Ser. No. 397,895 filed Aug. 24, 1989, now abandoned.

BACKGROUND OF THE INVENTION

1. Field of the Invention

The present invention relates to a light scanning apparatus used with an image forming apparatus such as a laser beam printer, copying machine and the like, in which an image is formed or recorded by scanning the image with a laser beam.

2. Related Background Art

Conventionally, as a light scanning apparatus of this kind, a light scanning apparatus used with an image forming apparatus shown in FIG. 12 has been proposed. More particularly, a light scanning apparatus 205 is constituted by a laser source (not shown) for emitting a laser beam, a rotatable polygonal mirror 201 for deflecting the laser beam and for scanning an image, a lens 203 for collecting the scanning light, and the like, these elements being integrally assembled on a support plate 206.

The scanning light emitted from the light scanning apparatus 205 is reflected by a reflection mirror 207 to be directed to a photosensitive drum 208 as a member to be scanned. The reflection mirror 207 is supported by a body of the image forming apparatus through an adjustment mechanism, whereby the scanning light emitted from the light scanning apparatus 205 can be adjusted to be illuminated in parallel with the photosensitive drum 208.

On the other hand, an image forming apparatus wherein a plurality of light beams are obtained by providing a plurality of light scanning apparatuses as mentioned above is shown in FIG. 13. In FIG. 13, a driving portion 302 is provided for driving two rotatable polygonal mirrors 301 in coaxial with each other. The driving portion comprises two sets of condenser lenses for collecting the respective laser beams and a laser beam unit (not shown) for emitting the laser beams to constitute a scanner unit 303. The scanner unit 303 is fitted into holes of a support plate 304 and fixed thereto.

Further, two reflection mirrors 307, 310 are provided for directing the respective scanning light beams to a photosensitive drum 305. A first scanning light 306 is reflected by a first reflection mirror 307 fixed to a side wall of the apparatus, and then is reflected by a reflection mirror 308 attached to the side wall of the apparatus through an adjustment mechanism to reach the photosensitive drum 305. The adjustment mechanism for the reflection mirror 308 comprises an adjusting means for adjusting the scanning light so that the scanning light scans the photosensitive drum 305 in parallel with a longitudinal direction of the drum 305, an illumination point adjusting means for adjusting the scanning light to position it to a predetermined illumination point, and a light path length adjusting means for correctly focusing the laser beam on the photosensitive drum 305.

On the other hand, a second scanning light 309 is reflected by a second reflection mirror 310, and then is reflected by a reflection mirror 311 having an adjustment mechanism similar to the adjustment mechanism for the reflection mirror 308 to reach the photosensitive drum 305.

However, when the plurality of reflection mirrors are arranged on the side wall of the image recording apparatus as in the above-mentioned conventional case, the following drawbacks will occur:

(1) Since the reflection mirrors are arranged on the side wall of the image forming apparatus, the optical adjustment must be effected during the assembling of the light scanning apparatus or after the assembling of the image forming apparatus, thus affecting the efficiency of the assembling of the apparatuses. Further, during the assembling, the reflection mirrors may be damaged or smeared, thus affecting the efficiency of production of the apparatus.

(2) When the reflection mirrors are attached to the side wall of the image forming apparatus, since the reflection mirrors are affected upon the vibration and/or distortion of the side wall of the image forming apparatus, the scanning light beams could not be scanned correctly on the photosensitive drum.

(3) If the error in accuracy of the optical system provided in the image forming apparatus occurs when the apparatus is in the market, it is impossible to readjust the optical system in the market, because there is no means for obtaining information regarding the positions where the plurality of scanning light beams are illuminated on the photosensitive drum, the parallelism between the scanning light beams and the photosensitive drum, and/or the relative difference between the scanning light beams, in the market.

SUMMARY OF THE INVENTION

An object of the present invention is to solve the above-mentioned drawbacks in the conventional apparatuses, and to provide a light scanning apparatus in which the optical adjustment can easily be effected and which can be easily and positively exchanged to another one even in the market, by integrally assembling reflection mirrors for reflecting scanning laser beams toward a member to be scanned and a laser beam detecting mechanism together with a light scanning optical system.

The above object is achieved by the present invention which provides a light scanning apparatus for scanning a member to be scanned (a scanned member) with laser beams, comprising a scanning optical system having reflection members attached to a driving source and for generating two or more modulated laser beams simultaneously, first reflection members for reflecting the respective modulated laser beams to diverge the laser beams each other, second reflection members arranged downstreamly of a light path with respect to the first reflection members and for reflecting the reflected laser beams on the scanned member, attachment means for fixing said scanning apparatus to a main apparatus, and a molded structure for integrally supporting the scanning optical system, first reflection members, second reflection members and attachment means altogether. Further, the present invention is directed to an image forming apparatus incorporating such light scanning apparatus.

DETAILED DESCRIPTION OF THE PREFERRED EMBODIMENTS

The present invention will now be explained with reference to the accompanying drawings.

Figure 2:
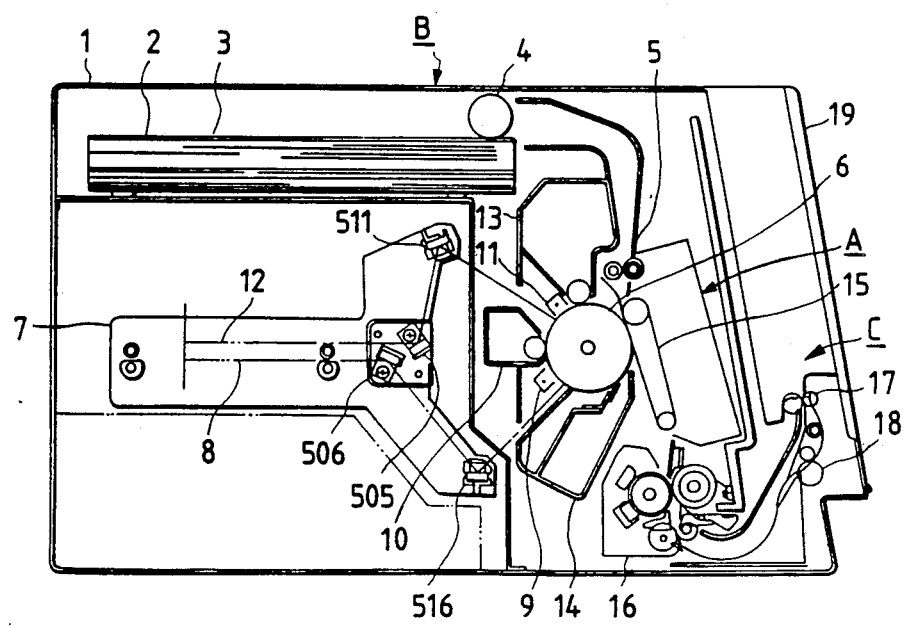
FIG. 2 is a schematic constructural view of an image forming apparatus incorporating the light scanning apparatus of FIG. 1.

FIG. 2 shows a whole construction of an image forming apparatus incorporating a light scanning apparatus according to a preferred embodiment of the present invention. In FIG. 2, an image recording apparatus 1 comprises an image forming portion A having a photosensitive drum 6, a sheet feeding portion B for feeding a transfer paper or sheet 2 to the image forming portion A, a light scanning apparatus 7 for scanning and exposing an image on the photosensitive drum 6, a fixing device 16 for fixing or recording the image transferred to the transfer sheet 2, and a sheet ejecting portion C for ejecting the transfer sheet after the fixing operation.

The sheet feeding portion B is of the type using a sheet cassette, where the transfer sheets 2 stacked in a sheet cassette 3 are fed one by one by means of a sheet feed roller 4 toward the interior of the apparatus.

The image forming portion A is designed to form the image in accordance with a well-known electrostatic photographic process, and comprises a first charger 9 for uniformly charging the photosensitive drum 6, a first developing device 10 for developing the image which is formed on the photosensitive drum 6 by means of the first scanning light from the light scanning apparatus 7, a second charger 11 for charging the photosensitive drum 6 again, a second developing device 13 for developing the image which is formed on the photosensitive drum 6 by means of the second scanning light from the light scanning apparatus 7, a cleaner 14 for cleaning or removing the remaining developer such as toner from the photosensitive drum 6, and a transfer charging belt 15 for transferring the image formed on the photosensitive drum 6 to the transfer sheet. These elements 9-15 are arranged around the photosensitive drum 6.

On the other hand, the sheet ejecting portion C includes a pair of ejector rollers 17 for ejecting the transfer sheet out of the apparatus, another pair of ejector rollers 18 for ejecting the transfer sheet in a direction different from a sheet ejecting direction by means of the elector rollers 17, and an ejector tray 19 rockable around a certain rotational axis for stacking the transfer sheet 2 ejected from either from the paired ejector rollers 17 or from the paired ejector rollers 18.

With the arrangement mentioned above, the transfer sheet 2 is fed by means of the sheet feed roller 4 from the sheet cassette 3 to regist rollers 5 where the transfer sheet is stopped by abutting against the regist rollers and a leading edge of the transfer sheet 2 is registered to be in parallel with respect to the longitudinal direction of the regist rollers by forming a loop in the transfer sheet. At a predetermined timing, the regist rollers 5 start to rotate, thereby conveying the transfer sheet to the transferring section. At the same time with the start of conveying by the regist rollers, the image is formed on the photosensitive drum 6 by the first and second scanning light beams 8, 12 through the chargers 9, 11 and the developing devices 10, 13. Thereafter, the image formed on the photosensitive drum is transferred to the transfer sheet 2 through the transfer charging belt 15, and then, the transferred toner image is fixed to the transfer sheet 2 by means of the fixing device 16. Then, the transfer sheet 2 is ejected out of the image recording apparatus by means of the paired ejector rollers 17 or 18 to be collected in the ejector tray 19.

Next, the light scanning apparatus arranged in the image forming apparatus will be fully explained.

(a) Optical Unit

Figure 7:
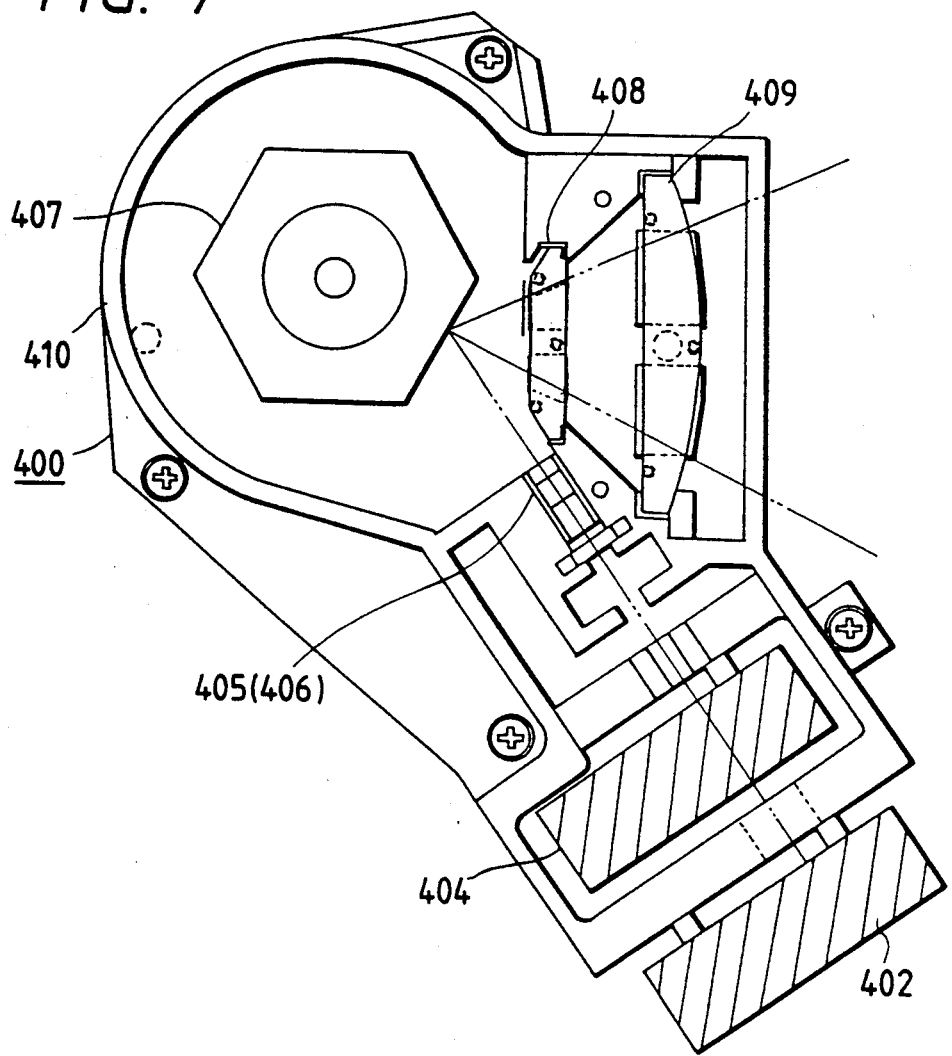
FIG. 7 is a plan view of an optical unit of the light scanning apparatus of FIG. 1.
Figure 8:
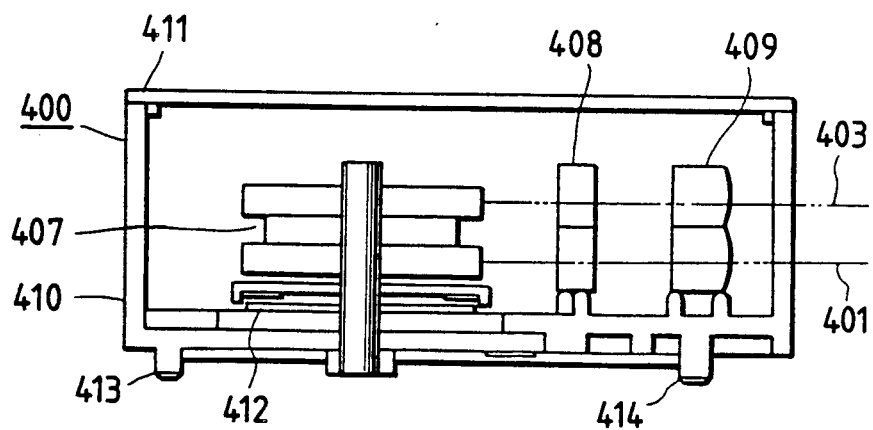
FIG. 8 is a longitudinal sectional view of the optical unit of FIG. 7.

FIGS. 7 and 8 show, in section, an optical unit 400 according to an embodiment. The optical unit 400 includes two laser units 402 and 404, from each of which first and second laser beams 401 and 403 are emitted, respectively.

After emitted from the respective laser units 402, 404, each of the laser beams 401, 403 is focused by a corresponding cylindrical lens 405, 406, and then is scanned by a polygonal mirror 407 to be directed toward a corresponding reflection mirror through a corresponding focusing lens 408, 409. The laser units 402, 404, polygonal mirror 407, cylindrical lenses 405, 406 and focusing lenses 408, 409 are integrally accommodated in an optical box 410. The optical box 410 is closed at its upper end by a cover 411 to form a closed housing. Incidentally, the reference numeral 412 designates a drive motor for rotating the polygonal mirror 407.

The housing constituted by the optical box 410 and the cover 411 is effective to prevent affection of dust and the like upon the light beams, i.e., to prevent the reduction of the permeability of the lenses due to the dust sticked to such lenses and/or the damage of the recording information due to the dust sticked to the laser units.

(b) Holding and Adjustment Mechanism for Reflection Mirrors

Next, a method for holding the reflection mirrors and an adjustment mechanism for adjusting the reflection mirrors will be explained.

Figure 1:
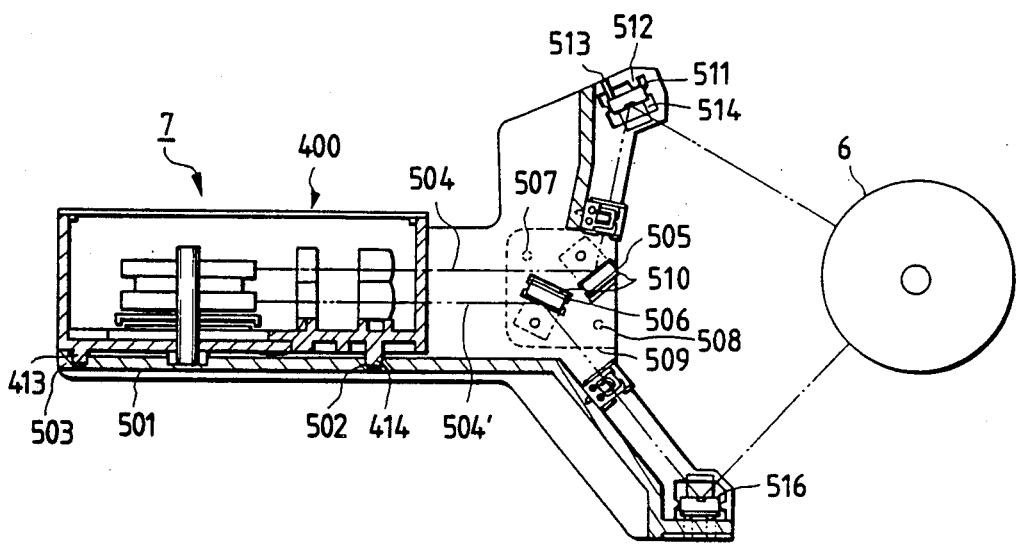
FIG. 1 is a sectional elevational view of a light scanning apparatus according to a preferred embodiment of the present invention.

As shown in FIG. 1, a frame-like stage 501 acting as a base for fixing and positioning the members necessary for the light scanning apparatus is integrally molded by using synthetic resin material. The optical unit 400 is positioned in place by fitting positioning pins 413, 414 formed on the optical unit 400 into positioning holes 502, 503 formed in the stage 501, and the optical unit 400 is fixed to the stage at a predetermined position by means of appropriate fasteners such as pins, screws and the like.

A first scanning light beam 504 and a second scanning light beam 504' emitted from the optical unit 400 are reflected by first reflection mirrors 505, 506, respectively. Each of the first reflection mirrors 505, 506 is positioned, at its one side, by a corresponding positioning boss 507, 508 formed on the stage 501 and is positioned by abutting one surface of the reflection mirror against a corresponding projection formed on a mirror supporting plate 509 fixedly mounted by pins. Further, the other surface of each first reflection mirror is biased by a corresponding resilient member 510 such as a leaf spring. Similarly, each first reflection mirror is, at its other longitudinal side, positioned and spring-biased in the same manner. Incidentally, each first reflection mirror 505, 506 is associated with one or single point on the respective projection of the mirror supporting plate 509, and, accordingly, is supported at three points.

On the other hand, one of second reflection mirrors, i.e., the second mirror 511 is supported, at its first point, by a boss 512 formed on the stage 501, and is supported, at its second point, by a movable member 513 such as a set pin and the like. And, the reflection mirror 511 is urged and supported, at its portion opposite to the second point, by a leaf spring 514. Further, the reflection mirror 511 is supported, at its third point on the other longitudinal side, by a set pin (not shown), and is urged, at its portion opposite to the third point, by a lead spring.

Since the second reflection mirror 511 is supported in this way, when the light scanning operation is performed with respect to the photosensitive drum, a tilt angle of the second reflection mirror 511 can be adjusted by changing the position of the set pin 513, whereby it is possible to correctly adjust the illumination point on the photosensitive drum.

Next, the other of second reflection mirrors, i.e., the second mirror 516 is supported, at its two points on a front side thereof, by set pins, and is urged and supported, at its opposite side, by a leaf spring. And, the second reflection mirror 516 is also supported, at its other longitudinal side, by a single set pin, and is urged, at its portion opposite to this set pin, by a leaf spring.

In this way, since the second reflection mirror 516 is supported, at its three points, by the set pins, a function or ability for adjusting lengths of the light paths for the scanning light beams can be presented, as well as the adjustment ability of the second reflection mirror 511. Such adjustment of the light path length is effected for correcting deviation or difference in magnification between the first and second light beams in the main scanning direction, which deviation would be caused due to the difference in dimensional error of the optical systems and/or the dispersion in the attachment positions of the reflection mirrors. Practically, it is very difficult to eliminate such difference in dimensional error of the optical systems and the dispersion in the attachment positions of the reflection mirrors. Accordingly, in an optical system wherein a image is formed by a plurality of scanning light beams, a light path length adjusting means as mentioned above is required. Alternatively, such adjusting means may be provided in a final or exit mirror for each of the laser beams. In this case, fine adjustment of the light path length can be effectively performed, since the distance between the adjustable mirror and the illumination position on the photosensitive drum can be shortest.

(c) Beam Detecting Mechanism (i) Holding Mechanism for Beam Detector

Generally, in a light scanning apparatus, it is practical to detect the scanning position of the laser beam, and a beam detector for detecting the position of the laser beam must be held with high accuracy. If the beam detector is held in a rough position, the beam detector will detect a wrong or erroneous scanning position.

Figure 9:
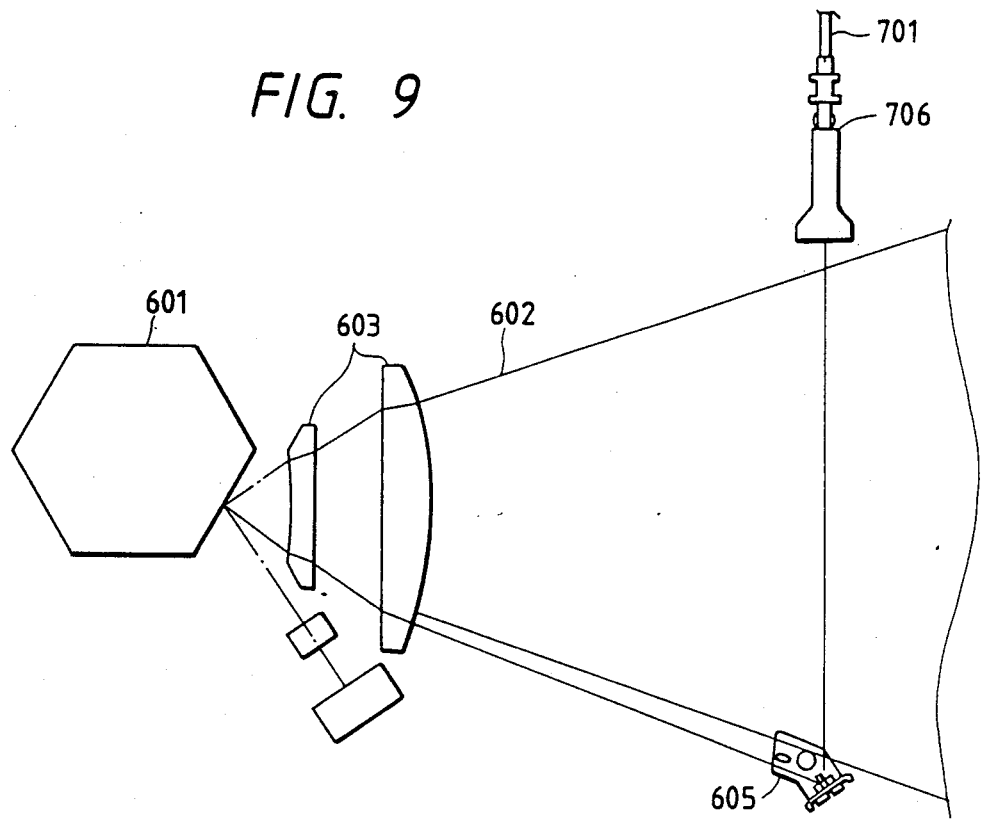
FIG. 9 is a schematic view showing an optical arrangement of the light scanning apparatus of FIG. 1.

A holding mechanism for a beam detector according to an embodiment of the present invention will be explained with reference to FIGS. 9 to 11.

A laser beam 602 scanned by a rotatable polygonal mirror 601 passes through a focusing lens 603. When the inner scanning position of the passed laser beam is positioned on a mirror 604, the laser beam is reflected by this mirror 604. A portion of the laser beam is detected by a laser beam detecting means 700 (FIG. 11) and is introduced into an optical fiber 701.

Figure 10:
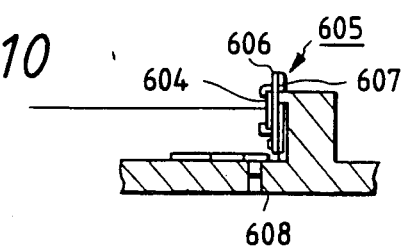
FIG. 10 is a sectional view showing a construction of a beam detector according to an embodiment of the invention.
Figure 11:
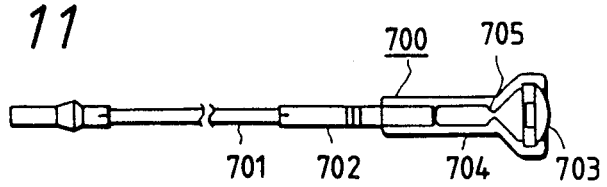
FIG. 11 is a sectional view showing a construction of a beam detecting mechanism according to an embodiment of the invention.
Figure 12:
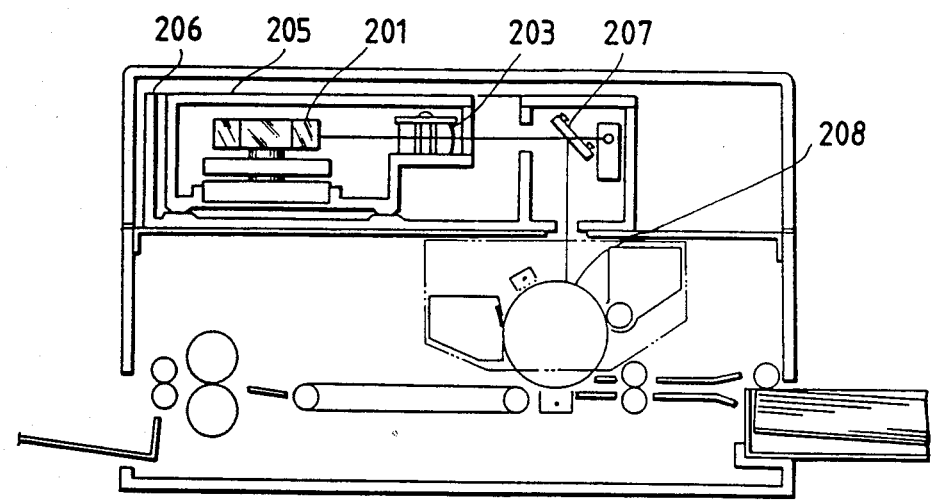
FIGS. 12 and 13 are schematic constructural views showing an image forming apparatus utilizing a conventional light scanning apparatus.
Figure 13:
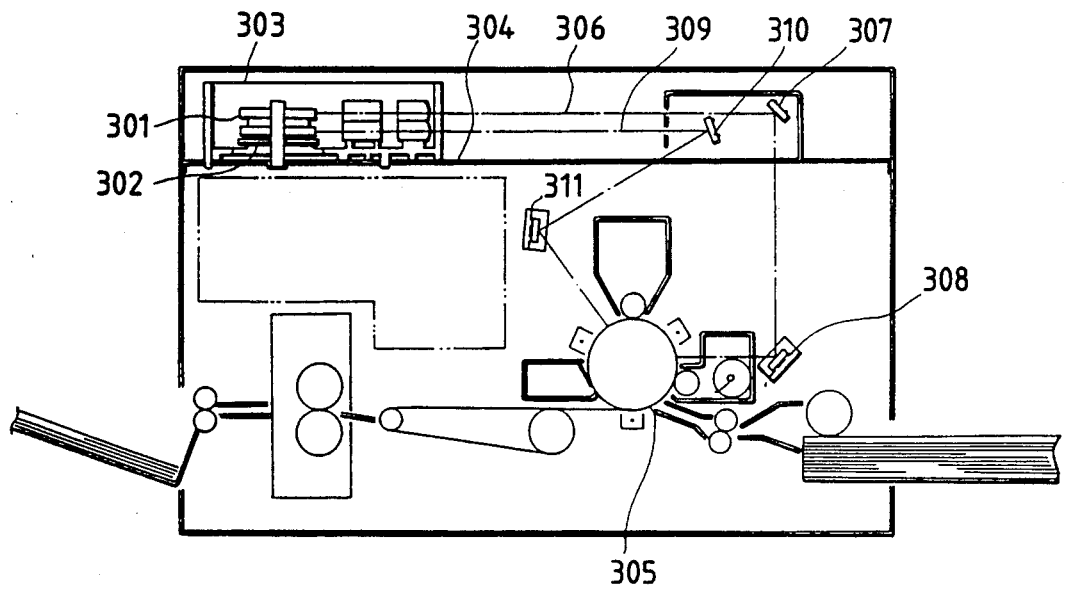

As shown in FIG. 10, a reflection means 605 including the mirror 604 comprises a bracket 606 to which the mirror 604 is attached, and a leaf spring 607 for holding the mirror 604. Such reflection means 605 is provided for each of the scanning light beams. Both of the reflection means have the same optical arrangement, and are fitted into holes 608 formed in the stage 501 and are fixed to the stage by means of fasteners such as pins, respectively.

(ii) Holding Mechanism for Beam Detecting Means

Next, a holding mechanism for the beam detecting means will be explained with reference to FIG. 11.

The beam detecting means 700 comprises the above-mentioned optical fiber 701 through which the laser beam passes, a connector portion 702 for passing the laser beam through the optical fiber 701, a condenser lens 703 for collecting the laser beam, and a holder 704 for holding these elements 701-703 altogether.

The holder 704 has a slit 705 formed therein, through which the laser beam passes, so that the laser beam to be introduced into the optical fiber 701 is restricted to further improve the detection accuracy In this way, since the detection elements integrally arranged as a unit on the single holder 704 ar positioned with high accuracy by means of positioning pins situated in the beam detecting positions for the respective scanning light beams, the scanning positions of the scanning light beams can be correctly detected.

Further, in the illustrated embodiment, since the beam detecting means 700 have the same optical arrangement with respect to the respective scanning light beams, all of the beam detecting means 700 having the same construction can be used.

Alternatively, in place of the above-mentioned arrangement that the integral beam detecting means 700 are positioned and fixed with respect to the stage 501, each of the beam detecting means 700 may be shiftable in a direction along which the beam reflected due to swings or tilts of the beam detector is moved. With this arrangement, a swing mechanism for the beam detector can be omitted, thus simplifying the construction of the beam detector. That is to say, since an adjustment range of the beam detecting means is larger than an adjustment range of the swings of the beam detector, the beam can be detected with higher accuracy.

Although in the conventional technique the beam could not be detected correctly even when the amount of the swings of the beam detector was slightly changed, in the illustrated embodiment described herein, since the swings of the beam detector is fixed and the position of the beam detecting means can be adjusted, the beam can be positively detected even if the beam detecting means 700 is shifted more or less. This is particularly effective when a distance between the beam detector and the beam detecting means 700 is long.

(d) Positioning of Optical Unit with Respect to Stage

The optical unit 400 is positioned by fitting the pins 413, 414 protruded from the optical unit 400 into the positioning holes 502, 503 formed in the stage 501, and the positioned optical unit 400 is fixed to the stage 501 by means of the pins and the like. Further, a motor drive circuit for driving the motor 412 for rotating the polygonal mirror 407 of the optical unit 400 is arranged on the stage 501. Further, a laser driver circuit for driving the laser unit to emit the laser beam is also arranged on the stage 501.

Since the laser power of each laser beam from the laser unit must be adjusted individually, by arranging the laser unit on the stage 501 as in the illustrated embodiment, before the laser unit is attached to the image recording apparatus to be treated integrally with the optical unit 400, the laser powers can be adjusted.

(e) Attachment of Light Scanning Apparatus to Image Forming Apparatus

Figure 3:
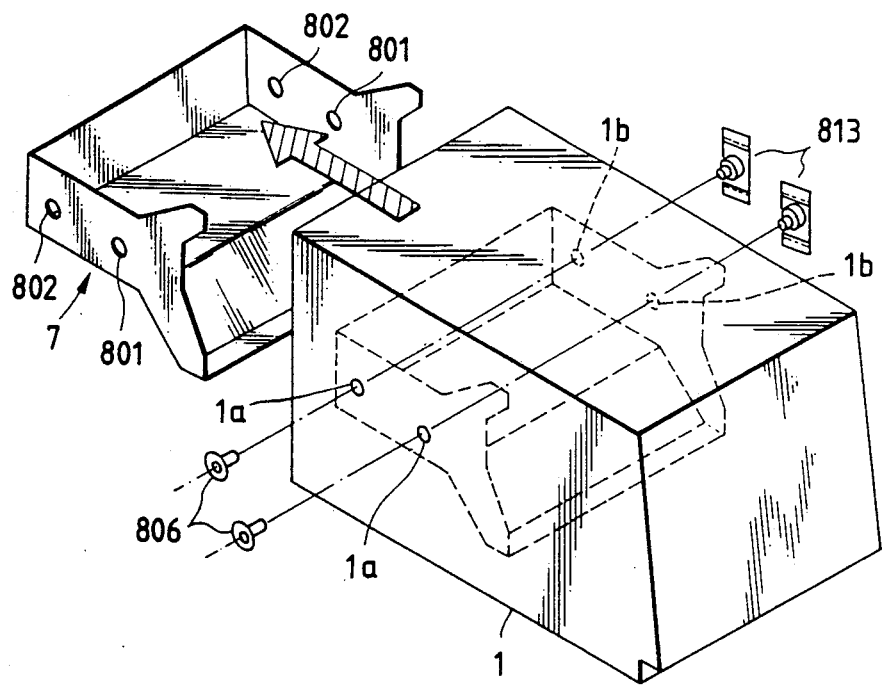
FIG. 3 is a perspective view showing the removability of the light scanning apparatus in the image forming apparatus of FIG. 2.
Figure 4:
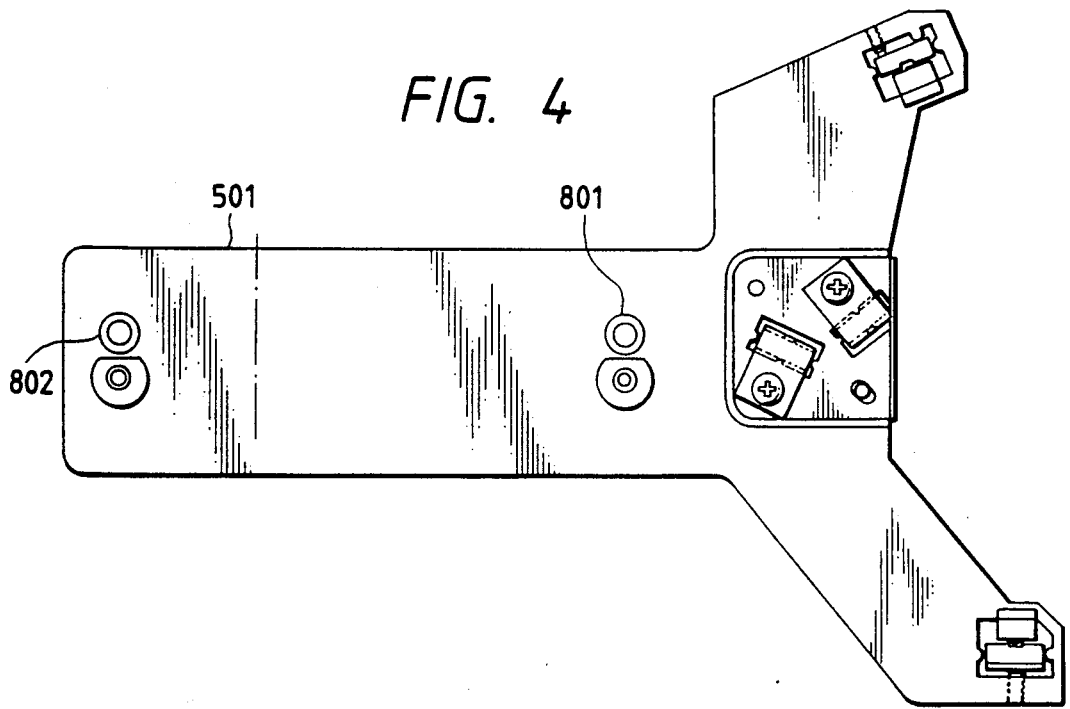
FIG. 4 is a side view of the light scanning apparatus of FIG. 1.

Attachment of the stage 501 on which the abovementioned various elements are mounted to the image forming apparatus 1 will be explained with reference to FIGS. 3 and 4.

Figure 6A:
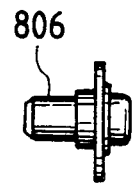
FIGS. 6A and 6B are top view and plan view of a fixing member according to another embodiment, respectively.
Figure 6B:
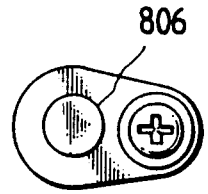

The stage 501 is provided at its both side walls with holes 801, 802 and the image forming apparatus 1 has attachment holes 1a, 1b. One of the side walls of the stage 501 is positioned and fixed with respect to the corresponding side wall of the image forming apparatus 1 by means of pins 806 shown in FIGS. 6A and 6B.

Figure 5A:
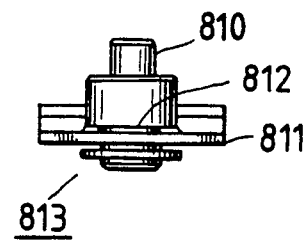
FIGS. 5A and 5B are top view and plan view of a fixing member of the light scanning apparatus of FIG. 1, respectively.
Figure 5B:
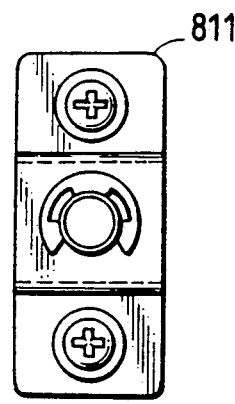

Further, the other side wall of the stage 501 is also fixed to the corresponding side wall of the image forming apparatus 1 by means of pusher means 813 each comprising a pin 810 shown in FIGS. 5A and 5B, a metal plate 811 and an resilient member, in the illustrated embodiment, a waved washer, 812 interposed between the pin and the metal plate. With this arrangement, the stage 501 is constantly pressed against the reference side wall of the image recording apparatus with a constant force by means of the pusher means 813.

Since the stage 501 is attached to the image recording apparatus in this way, even when the relative position between the side walls of the stage is varied more or less (for example, when the side walls ar flexed during the operation of the apparatus and/or when the both side walls are deviated from each other), the stage 501 is not distorted because such variation in the relative position can be absorbed by the waved washers 812. Therefore, the optical system mounted on the stage 501 is not subject to the variation of the image recording apparatus 1, thus providing extremely stable light scanning operation.

In the illustrated embodiment, while two pusher means 813 were used, the single pusher means 813 may be used for supporting the stage 501. In this case, the stage 501 is supported at three points, which is less influenced from the image recording apparatus 1 than the four-point support as in the above illustrated embodiment.

As mentioned above, according to the present invention, since the scanning optical system for emitting the laser beams and the reflection members such as reflection mirrors are accommodated altogether in the frame or box, before these elements are assembled into the image recording apparatus, the optical adjustment of such elements can be performed outside of the apparatus, thus providing the accurate and easy optical adjustment.

Further, by using the light scanning apparatus according to the present invention, it is no need for adjusting the illumination positions of the laser beams and/or the relative position between the laser beams in the market, and, if necessary, the light scanning apparatus may merely be exchanged, thus greatly improving the maintenance of the apparatus.

What is claimed is:

1. A scanning apparatus for scanning a member to be scanned with laser beams, comprising:
   a scanning optical system having reflection members attached to a driving source and for generating two or more modulated laser beams simultaneously;
   first reflection members for reflecting the respective modulated laser beams to diverge said laser beams from each other;
   second reflection members having position adjustment means and arranged downstream of a light path with respect to said first reflection members and for reflecting the reflected laser beams on said member to be scanned;
   attachment means for fixing said scanning apparatus to a main apparatus; and
   a molded structure for integrally supporting said scanning optical system, said first reflection members, said second reflection members and said attachment means altogether.

2. A scanning apparatus according to claim 1, wherein said scanning optical system comprises a laser beam source, a polygonal mirror and focusing lenses, which are integrally supported by a molded structure.

3. A scanning apparatus according to claim 1, wherein two laser beam sources are provided, parallel laser beams are emitted from said scanning optical system, the respective modulated laser beams are reflected by two first reflection members to diverge said laser beams from each other, and the diverged laser beams are reflected by two second reflection members to converge said laser beams each other.

4. A scanning apparatus for scanning a member to be scanned with laser beams, comprising:
   a scanning optical system having comprising a unit constituted by a laser beam source, a reflection mirror attached to a driving source and focusing lenses, which are integrally supported by a molded structure, and for generating two or more modulated laser beams simultaneously;
   first reflection members for reflecting the respective modulated laser beams to diverge said laser beams from each other;
   second reflection members arranged downstreamly of a light path with respect to said first reflection members and for reflecting the reflected laser beams on said member to be scanned;
   attachment means for fixing said scanning apparatus to a main apparatus; and
   a molded structure for integrally supporting said scanning optical system, said first reflection members, said second reflection members and said attachment means altogether.

5. A scanning apparatus for scanning a member to be scanned with laser beams, comprising:
   a scanning optical system having reflection members attached to a driving source and for generating two modulated laser beams simultaneously;
   first reflection members for reflecting the respective modulated laser beams to diverge said laser beams from each other;
   second reflection members having position adjustment means and arranged downstreamly of a light path with respect to said first reflection members and for reflecting the reflected laser beams on said member to be scanned;
   attachment means for fixing said scanning apparatus to a main apparatus; and
   a T-shaped molded structure for integrally supporting said scanning optical system, said first reflection members, said second reflection members and said attachment means altogether,
   wherein said scanning optical system and two said second reflection members are arranged on both ends of said structure, and said first reflection members are arranged in a central portion of said structure.

6. A scanning apparatus according to claim 5, wherein two laser beam sources are provided, parallel laser beams are emitted from said scanning optical system, the respective modulated laser beams are reflected by two first reflection members to diverge said laser beams from each other, and the diverged laser beams are reflected by two second reflection members to converge said laser beams each other.

7. An image forming apparatus comprising:
   an electrophotographic photosensitive member;
   A scanning unit constituted by a scanning optical system having reflection members attached to a driving source and for generating two or more modulated laser beams simultaneously, first reflection members for reflecting the respective modulated laser beams to diverge said laser beams from each other, second reflection members arranged downstream of a light path with respect to said first reflection members and for reflecting the reflected laser beams directly on said electrophotographic photosensitive member, attachment means for fixing said scanning unit to said apparatus, and a molded structure for integrally supporting said scanning optical system, said first reflection members, said second reflection members and said attachment means altogether; and
   an image forming means provided around said photosensitive member for forming an image on said photosensitive member,
   wherein said laser beams reflected by said second reflection members are illuminated on different positions on said photosensitive member through said image forming means.

8. An image forming apparatus according to claim 7, wherein said scanning unit is formed as a T-shaped structure, said scanning optical system and two said second reflection members are arranged on both ends of said T-shaped structure, and said first reflection members are arranged in a central portion of said T-shaped structure.

9. An image forming apparatus according to claim 7, wherein said image forming means situated between said laser beams illuminated on said photosensitive member includes developing devices.

10. An image forming apparatus according to claim 7, wherein a portion of said image forming means situated between said laser beams illuminated on said photosensitive member includes chargers and developing devices.

11. An image forming apparatus comprising:
   an electrophotographic photosensitive member;
   a scanning unit constituted by a scanning optical system having reflection members attached to a driving source and for generating two modulated laser beams simultaneously, first reflection members for reflecting the respective modulated laser beams to diverge said laser beams from each other, second reflection members arranged downstreamly of a light path with respect to said first reflection members and for forming a light path to approach said laser beams in the vicinity of said electrophotographic photosensitive member and for reflecting the reflected laser beams directly on said electrophotographic photosensitive member, attachment means for fixing said scanning unit to said apparatus, and a T-shaped molded structure for integrally supporting said scanning optical system, said first reflection members, said second reflection members and said attachment means altogether; and
   an image forming means provided around said photosensitive member for forming an image on said photosensitive member,
   wherein said scanning optical system and two said second reflection members are arranged on both ends of said T-shaped structure of said scanning unit, respectively, and said first reflection members are arranged in a central portion of said T-shaped structure and wherein said laser beams reflected by said second reflection members are illuminated on different positions on said photosensitive member through said image forming means.

12. An image forming apparatus according to claim 11, wherein said image forming means situated between said laser beams illuminated on said photosensitive member includes developing devices.

13. An image forming apparatus according to claim 11, wherein said image forming means situated between said laser beams illuminated on said photosensitive member includes chargers and developing devices.

14. A beam scanning apparatus, comprising:
   first and second light sources emitting laser beams;
   a deflection member for deflecting the laser beams from said first and second light sources by rotation thereof;
   first and second reflection mirrors for reflecting the laser beams deflected by said deflection member, said first and second reflection mirrors reflecting the laser beams into opposite directions;
   a first distance from said deflection member to said first reflection mirror and a second distance from said deflection to said second reflection mirror being different from each other.

15. A beam scanning apparatus according to claim 14, wherein said first and second reflection mirrors are aligned parallel.

16. A beam scanning apparatus according to claim 14, wherein angles of said first and second reflection mirrors are adjustable.

17. A beam scanning apparatus according to claim 14, wherein said first and second reflection mirrors are attached onto a common side plate.

18. A beam scanning apparatus according to claim 14, wherein a first scan plane by the laser beam from said first light source just after being deflected by said deflected member and a second scan plane by the laser beam from said second light source just after being deflected by said reflection member are parallel to each other.

19. A light scanning apparatus, comprising:
a laser beam source;
a deflection member for rotatably deflecting the laser beam from said laser beam source;
lens means for transmitting the laser beam deflected by said deflection member;
a first housing for holding said laser beam source, deflection member and lens means;
first reflection means for introducing the beam outputted from said first housing to a photosensitive member;

second reflection means for reflecting the laser beam to detect a position of the laser beam deflected by said deflection member;
a second housing for holding said first and second reflection means;
said first housing being mountable onto said second housing.

20. A light scanning apparatus according to claim 19, wherein said first housing holds plural laser beam sources.

21. A light scanning apparatus according to claim 19, wherein said first housing has a cover for preventing entry of dust.

22. A light scanning apparatus according to claim 19, wherein said second housing has a stage portion having a positioning hole for positioning said first housing.

23. A light scanning apparatus according to claim 19, wherein said first and second reflection means have plural mirrors, respectively.

24. A light scanning apparatus according to claim 23, wherein an angle of the mirrors of said first reflection means is adjustable.

* * * * *

UNITED STATES PATENT AND TRADEMARK OFFICE
CERTIFICATE OF CORRECTION

PATENT NO. : 5,001,499

DATED : March 19, 1991

INVENTOR(S) : TSUYOSHI WARAGAI, ET AL.            Page 1 of 3

It is certified that error appears in the above-identified patent and that said Letters Patent is hereby corrected as shown below:

On the Title page:

IN [56] REFERENCES CITED

Attorney, Agent, or Firm: "Fitzpatrick Cella Harper & Scinto" should read --Fitzpatrick, Cella, Harper & Scinto--.

COLUMN 2

Line 53, "each" should read --from each--.

COLUMN 4

Line 6, "elector" should read --ejector--.
Line 39, "emitted" should read --being emitted--.
Line 55, "sticked" should read --stuck--.
Line 56, "sticked" should read --stuck--.

COLUMN 5

Line 19, "single" should read --a single--.

COLUMN 6

Line 42, "accuracy" should read --accuracy.--.
Line 44, "ar" should read --are--.

UNITED STATES PATENT AND TRADEMARK OFFICE
CERTIFICATE OF CORRECTION

PATENT NO. : 5,001,499

DATED : March 19, 1991

INVENTOR(S) : TSUYOSHI WARAGAI, ET AL.

It is certified that error appears in the above-identified patent and that said Letters Patent is hereby corrected as shown below:

COLUMN 7

Line 2, "is" should read --are--.
Line 32, "its both" should read --both its--.
Line 51, "ar" should read --are--.
Line 52, "the both" should read --both the--.
Line 64, "from" should read --by--.

COLUMN 8

Line 9, "it" should read --there--.
Line 46, "each" should read --from each--.
Line 50, "having" should be deleted.

COLUMN 9

Line 32, "each" should read --from each--.
Line 35, "A" should read --a--.

COLUMN 10

Line 58, "deflection" should read --deflection member--.

UNITED STATES PATENT AND TRADEMARK OFFICE
CERTIFICATE OF CORRECTION

PATENT NO. : 5,001,499

DATED : March 19, 1991

INVENTOR(S) : TSUYOSHI WARAGAI, ET AL.

It is certified that error appears in the above-identified patent and that said Letters Patent is hereby corrected as shown below:

COLUMN 11

Line 5, "flected" should read --flection--.
    Line 7, "reflection member" should read --deflection member--.

Signed and Sealed this

Fifteenth Day of December, 1992

Attest:

DOUGLAS B. COMER

*Attesting Officer*    *Acting Commissioner of Patents and Trademarks*